(12) United States Patent
Matsumoto et al.

(10) Patent No.: US 6,914,768 B2
(45) Date of Patent: Jul. 5, 2005

(54) ELECTRICAL DOUBLE-LAYER CAPACITOR

(75) Inventors: Yasuhiro Matsumoto, Wako (JP); Kenji Sato, Wako (JP); Masayuki Takeda, Yokkaichi (JP); Hideo Nagaoka, Yokkaichi (JP)

(73) Assignees: Honda Motor Co., Ltd., Tokyo (JP); Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/720,986

(22) Filed: Nov. 25, 2003

(65) Prior Publication Data

US 2004/0130852 A1 Jul. 8, 2004

(30) Foreign Application Priority Data

Nov. 29, 2002 (JP) ........................................ 2002-348881

(51) Int. Cl.[7] .............................. H01G 9/00; H01G 9/02
(52) U.S. Cl. ........................ 361/502; 252/62.2; 361/504
(58) Field of Search ................................ 361/502–507; 252/62.2

(56) References Cited

U.S. PATENT DOCUMENTS 6,304,426 B1 * 10/2001 Wei et al. .................... 361/502
6,414,837 B1 * 7/2002 Sato et al. .................... 361/504
6,459,564 B1 * 10/2002 Watanabe et al. ............ 361/502

FOREIGN PATENT DOCUMENTS

| JP | 2000-311839 | 11/2000 |
| JP | 2000-331887 | 11/2000 |

* cited by examiner

*Primary Examiner*—Eric Thomas
(74) *Attorney, Agent, or Firm*—Arent Fox, PLLC

(57) ABSTRACT

An electrical double-layer capacitor showing a sleight increase of resistance when used under continuous application of high voltage and maintaining high energy residual ratio after standing for a long time includes an electrode element including a pair of electrodes disposed opposite to each other with a separator interposed therebetween, and is impregnated with a nonaqueous electrolyte solution prepared by dissolving quaternary ammonium salts into cyclic carbonates and containing impurities of 30 ppm or less of glycols, 30 ppm or less of primary alcohols and less than 20 ppm of tertiary amines. The water content may be 50 ppm or less. The quaternary ammonium salt may be triethylmethylammonium tetrafluoroborate. The cyclic carbonate may be propylene carbonate. The nonaqueous electrolyte solution may have a concentration of 0.1 to 2.5 mol/liter. The electrode may be a polarizable electrode composed of activated carbon.

6 Claims, 3 Drawing Sheets

FIG. 1 (a)
FIG. 1 (b)
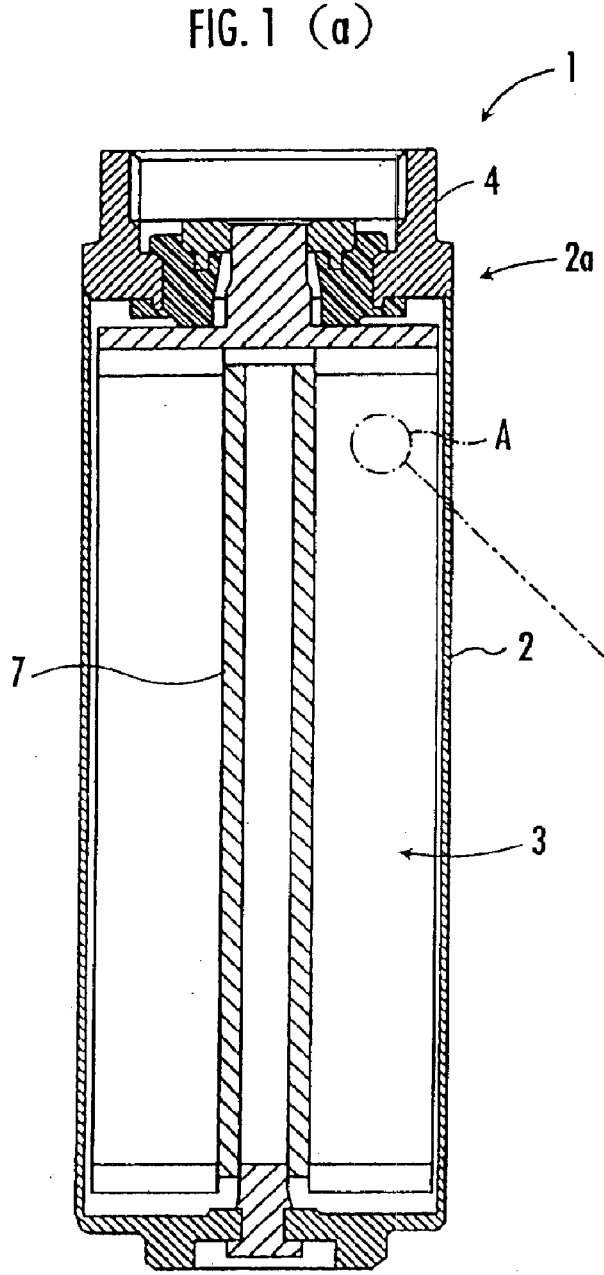
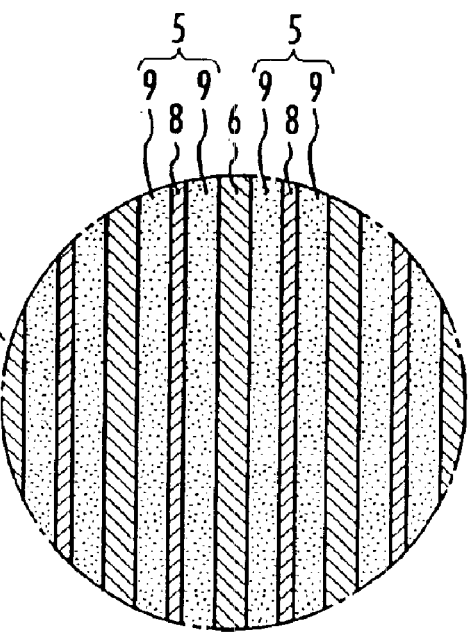

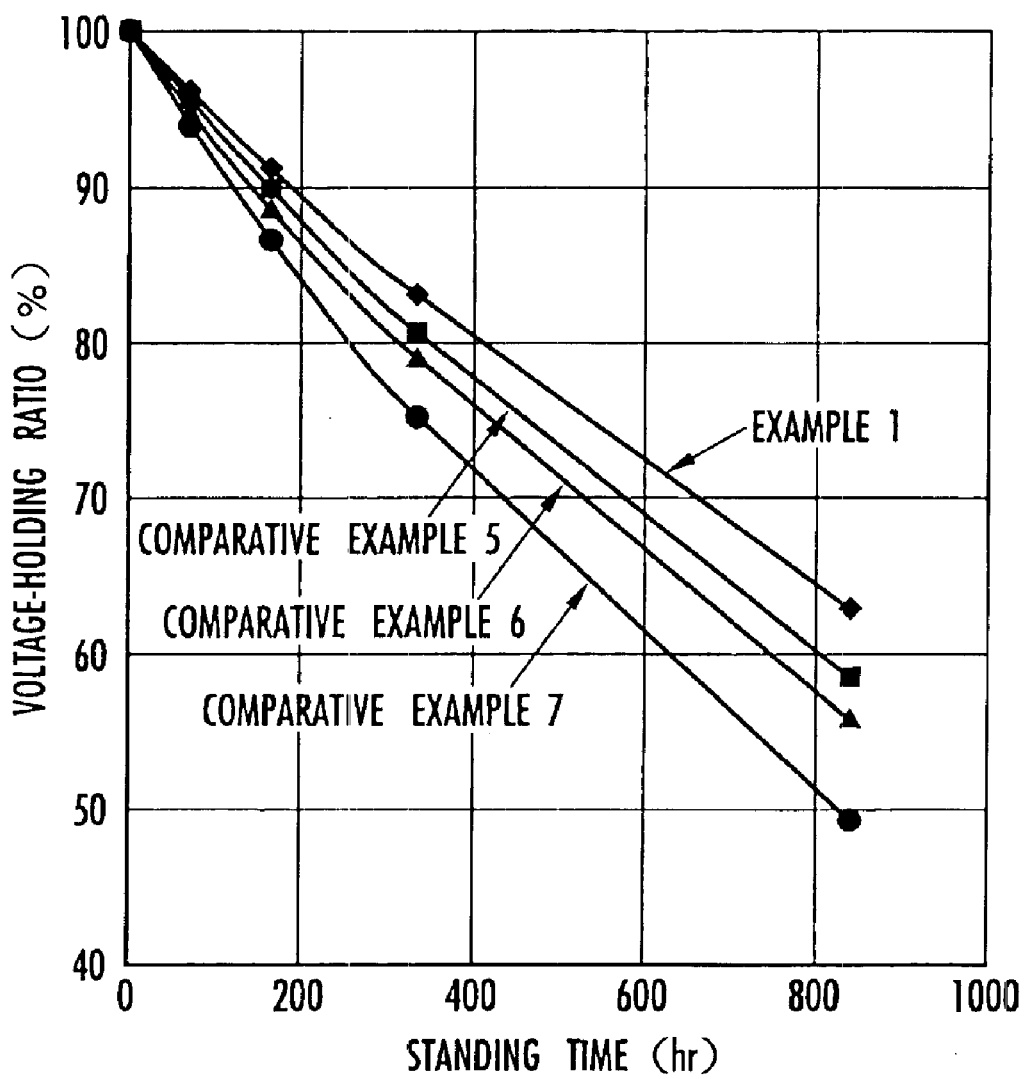

ELECTRICAL DOUBLE-LAYER CAPACITOR

BACKGROUND OF THE INVENTION

1. Field of the Invention

The present invention relates to an electrical double-layer capacitor, more particularly to an electrical double-layer capacitor using a nonaqueous electrolyte solution.

2. Description of the Related Art

An electrical double-layer capacitor comprises a structure in which a separator and an electrode element consisting of a pair of polarizable electrodes disposed opposite to each other with the separator interposed therebetween are sealed in a case, and the electrode element is impregnated with an electrolyte solution.

The polarizable electrode is formed, for example, by press molding activated carbon particles or by coating a mixture of the activated carbon particles with a suitable binder on a current collector metal. Further, an activated carbon fiber on which alumina is plasma sprayed can also be used for the polarizable electrode.

An aqueous electrolyte solution such as sulfuric acid or an aqueous potassium hydroxide solution and a nonaqueous electrolyte solution in which a quaternary ammonium salt is dissolved in an organic solvent such as propylene carbonate are known as the electrolyte solution. As the nonaqueous electrolyte solution can increase drive voltage when used for an electrical double-layer capacitor and can increase energy density compared with the case where an aqueous electrolyte solution is used, it is suitable for the applications requiring high output such as the electrical double-layer capacitor to be mounted on an electric vehicle.

A small amount of impurities contained in the nonaqueous electrolyte solution are known to reduce the withstand voltage of an electrical double-layer capacitor and degrade the capacity of the electrical double-layer capacitor. The impurities include glycols such as propylene glycol, ethylene glycol and diethylene glycol that are contained in an organic solvent such as propylene carbonate described above; a tertiary amine that is an unreacted raw material contained in the quaternary ammonium salt; and a tertiary ammonium salt as a reaction product of the tertiary amine.

Japanese Patent Laid-Open No. 2000-331887 proposes to suppress the reduction of the withstand voltage and degradation of the capacity of an electrical double-layer capacitor by reducing the content of glycols in the nonaqueous electrolyte solution to 100 ppm or less. In addition, Japanese Patent Laid-Open No. 2000-311839 proposes to suppress the reduction of the withstand voltage and degradation of the capacity of an electrical double-layer capacitor by reducing the content of a tertiary amine and a tertiary ammonium salt in the nonaqueous electrolyte solution to 2 mmol/kg or less.

However, even when using the nonaqueous electrolyte solution in which the contents of the glycols or a tertiary amine and tertiary ammonium salt are within the range described above, the electrical double-layer capacitor has the disadvantage of a large increase in resistance when used under continuous application of high voltage. Moreover, the electrical double-layer capacitor has the disadvantages of having low self-discharge properties and an insufficient energy residual ratio when it is left standing for a long period of time.

SUMMARY OF THE INVENTION

It is an object of the present invention to provide an electrical double-layer capacitor that has eliminated these disadvantages; shows only a small increase in resistance even when used under continuous application of high voltage; and has a high energy residual ratio even after it is left standing for a long period of time.

The inventors have studied the above described problems of prior arts, and found that a nonaqueous electrolyte solution to be used for an electrical double-layer capacitor has not only the impurities contained in the electrolyte solution itself, but also the impurities that are incorporated into the electrolyte solution after the electrolyte solution is impregnated into an electrode element.

The inventors have further studied based on the findings, and found that among the impurities that are incorporated into the electrolyte solution after the electrolyte solution is impregnated into the electrode element, three types of substances, that is, glycols, primary alcohols and tertiary amines, have an effect on the performance of the electrical double-layer capacitor. According to the study of the inventors, the inclusion of these impurities in the nonaqueous electrolyte solution electrochemically decomposes the electrolyte solution at the interface of an activated carbon electrode and the electrolyte solution to generate gas to cause increase of resistance, when an electrical double-layer capacitor is used under continuous application of high voltage. Furthermore, when the electrical double-layer capacitor is left standing for a long period of time, the above described impurities promote the self-discharge to reduce the energy residual ratio.

As a result, the inventors have found that the electrical double-layer capacitor shows only a small increase of resistance even when used under continuous application of high voltage, and can have a high energy residual ratio even after it is left standing for a long period of time by setting the contents of the above described three kinds of substances within acceptable ranges, and have completed the present invention.

Thus, an electrical double-layer capacitor of the present invention, for achieving the above described object, comprises an electrode element consisting of a separator and a pair of electrodes disposed opposite to each other with the separator interposed therebetween, the electrode element being impregnated with a nonaqueous electrolyte solution, wherein the nonaqueous electrolyte solution is prepared by dissolving a quaternary ammonium salt in a cyclic carbonate, and the impurities contained in the nonaqueous electrolyte solution impregnated into the electrolyte element comprise 30 ppm or less of glycols, 30 ppm or less of primary alcohols and less than 20 ppm of tertiary amines.

According to the electrical double-layer capacitor of the present invention, the electrochemical decomposition of the electrolyte solution at the interface of the electrode and the electrolyte solution can be suppressed to reduce the increase of resistance by setting the contents of the above described three kinds of substances, that is, glycols, primary alcohols and tertiary amines, contained in the nonaqueous electrolyte solution as impurities within the above described ranges. In addition, the self-discharge can be suppressed to increase the energy residual ratio, that is, the voltage-holding ratio after the capacitor is left standing for a long period of time by setting the contents of the three kinds of substances within the above described range.

The electrical double-layer capacitor of the present invention preferably has the water content in the nonaqueous electrolyte solution impregnated into the electrolyte element of 50 ppm or less. The water content in the nonaqueous electrolyte solution of higher than 50 ppm causes hydrolysis of the cyclic carbonate, solvent of the nonaqueous electrolyte solution, increasing the contents of glycols and primary alcohols with time. In addition, the water content in the nonaqueous electrolyte solution of higher than 50 ppm causes decomposition of the quaternary ammonium salt contained in the nonaqueous electrolyte solution, increasing the content of the tertiary amines with time.

In the electrical double-layer capacitor of the present invention, the quaternary ammonium salt is preferably triethylmethylammonium tetrafluoroborate. The use of triethylmethylammonium tetrafluoroborate can provide an electrolyte solution that has good electric conductivity due to large ionic mobility and high degree of dissociation of salt, high decomposition voltage, high hydrolysis resistance and good heat stability.

In addition, in the electrical double-layer capacitor of the present invention, the cyclic carbonate is preferably propylene carbonate. The use of propylene carbonate can provide an electrolyte solution that has good electrical conductivity and high decomposition voltage and can be used in a wide temperature range.

When triethylmethylammonium tetrafluoroborate is used as the quaternary ammonium salt and propylene carbonate is used as the cyclic carbonate, triethylmethylammonium tetrafluoroborate is preferably dissolved in propylene carbonate in a concentration ranging from 0.1 to 2.5 mol/liter. The concentration of lower than 0.1 mol/liter reduces the electrical conductivity of the electrolyte solution, increasing the inner resistance of the electrical double-layer capacitor, and that of higher than 2.5 mol/liter can cause precipitation of salt in low temperatures, causing troubles.

Further, in the electrical double-layer capacitor of the present invention, as the above described electrode is electrochemically inactive to the above described nonaqueous electrolyte solution, has suitable electrical conductivity and has a large electrode interface for accumulating charge, it is preferably a polarizable electrode composed of an activated carbon.

BRIEF DESCRIPTION OF THE DRAWINGS

FIG. 1(*a*) is an illustrative sectional view showing the construction of the electrical double-layer capacitor according to the present embodiment;

FIG. 1(*b*) is an enlarged view of part A in FIG. 1(*a*);

FIG. 4 is a graphical representation showing the relation of tertiary amine concentration to the voltage-holding ratio.

DETAILED DESCRIPTION OF THE PREFERRED EMBODIMENTS

Figure 2:
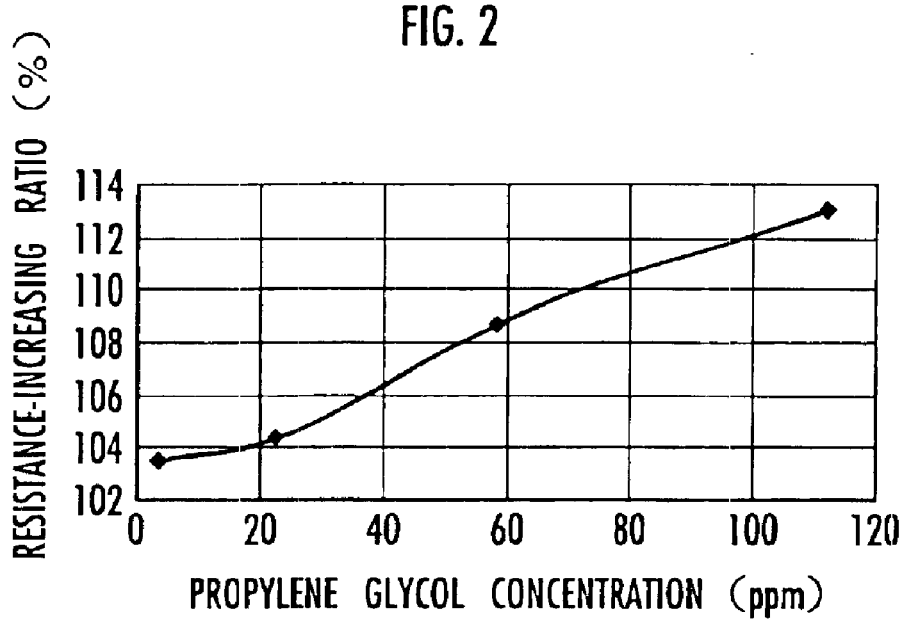
FIG. 2 is a graphical representation showing the relation of propylene glycol concentration to the resistance-increasing ratio.

The embodiments of the present invention will now be described in detail referring to the appended drawings.

As shown in FIG. 1(*a*), an electrical double-layer capacitor 1 of the present embodiment comprises the construction in which an electric element 3 is contained in a metal cylindrical container 2 with a bottom and an opening 2*a* of the container 2 is sealed with a lid 4. The electric element 3, as shown in FIG. 1(*b*), is formed by disposing a pair of polarizable electrodes 5 and 5, which is prepared by forming carbonaceous material layers 9 on both sides of a current collector 8, opposite to each other with a separator 6 interposed therebetween to form a positive electrode and a negative electrode and by winding them around a hollow core 7. In addition, the electrode element 3 is impregnated with a nonaqueous electrolyte solution.

The carbonaceous material layer 9 is preferably comprises a carbonaceous material as a main component because it is electrochemically inactive to the nonaqueous electrolyte solution and has suitable electrical conductivity. Further, it is preferable to use an activated carbon having a specific surface area of 10 $m^2/g$ or more as determined by the BET adsorption isotherm according to the nitrogen adsorption method so as to have a large electrode interface for accumulating charge. The specific surface area of the activated carbon cannot be unconditionally defined due to the reasons such as the difference of capacitance ($F/cm^2$) per unit area for carbonaceous species and the reduction of bulk density associated with the increase of specific surface area, but it is preferably in the range of 30 to 2,500 $m^2/g$ as determined by the BET adsorption isotherm according to the nitrogen adsorption method, and most preferably in the range of 300 to 2,300 $m^2/g$ because the capacitance per volume is increased.

In addition, when a particulate carbonaceous material is used, an average particle size is preferably 30 $\mu$m or less so as to improve the bulk density of the electrode and reduce the inner resistance.

The carbonaceous material layer 9 comprising a carbonaceous material as a main component comprises the carbonaceous material, a conductive agent and a binder material, and can be molded by a conventionally known method.

The conductive agents that can be used include carbon blacks such as acetylene black and Ketjenblack, natural graphite, thermally expansive graphite, carbon fiber, ruthenium oxide, titanium oxide, and metal fibers such as aluminum and nickel. The conductive agents can be used singly or in combination of two or more. As the conductive agent, acetylene black or Ketjenblack is most preferably used because it effectively improves electrical conductivity by a small amount.

The amount of the conductive agent to be compounded relative to the carbonaceous material, when the carbonaceous material is an activated carbon, although different depending on the bulk density of the activated carbon, is preferably 4 to 50% of the weight of the activated carbon, most preferably 5 to 30%. If the amount of the conductive agent to be compounded is larger than the above described range, the ratio of the activated carbon relative to the total carbonaceous material layer 9 becomes lower, reducing capacitance.

The binder material may include materials such as polytetrafluoroethylene, polyvinylidene fluoride, carboxymethylcellulose, fluoroolefin copolymer crosslinked polymer, polyvinyl alcohol, polyacrylic acid, polyimide, petroleum pitch, coal pitch, and phenol resins. One or more of the above described materials is preferably used as the binder material.

The method for molding the carbonaceous material layer 9 may include, for example, a method in which a mixture of a carbonaceous material and acetylene black as a conductive agent is added to polytetrafluoroethylene as a binder material, mixed and then press molded.

Moreover, only the carbonaceous material may be sintered without using a conductive agent and a binder material to prepare the carbonaceous material layer 9; or the carbonaceous material and the binder material may be sintered without using the conductive agent to prepare the carbonaceous layer 9. Such methods may include, for example, a method in which a sintered body obtained by mixing a carbonaceous material and a binder material such as pitch, tar and phenol resins, molding, and then heat-treating under inert atmosphere is used for the carbonaceous material layer 9.

The carbonaceous material layer 9 may be a thin coating film or a molding. The molding may be a sheet-like or a plate-like molding, or a plate-like molding comprised of a composite.

The current collector 8 may be any materials with electrochemical and chemical corrosion resistance, and the materials to be used may suitably include, for example, but not limited to, stainless steel, aluminum, titanium, tantalum for the positive electrode, and stainless steel, aluminum, nickel, copper for the negative electrode.

The separator 6 is preferably, but not limited to, a thin material having high electrical insulating and ion penetrating properties, and may suitably include non-woven fabrics made of polyethylene, polypropylene, paper, rayon and the like.

A solution of a quaternary ammonium salt in a cyclic carbonate is used as a nonaqueous electrolyte solution to be impregnated into the electrode element 3.

The quaternary ammonium salt is prepared by combining a quaternary ammonium cation and a fluorine-containing anion. The quaternary ammonium cations may include, for example, tetramethylammonium, ethyltrimethylammonium, diethyldimethylammonium, triethylmethylammonium, tetraethylammonium, tetrabutylammonium, N,N-dimethylpyrrolidinium, N-ethyl-N-methylpyrrolidinium, N,N-dimethylpiperidinium, benzyltrimethylammonium, N-ethylpyridinium, N,N'-dimethylimidazolium, and N-ethyl-N'-methylimidazolium. Triethylmethylammonium and tetraethylammonium can be suitably used as the quaternary ammonium cation, because they can provide an electrolyte solution that has good electric conductivity due to large ionic mobility and the degree of dissociation of salt, high decomposition voltage, high hydrolysis resistance and good heat stability.

Typically, the quaternary ammonium cation can be produced by reacting a tertiary amine with an alkyl halide or a carbonate diester. However, the quaternary ammonium cation as a product preferably contains no halogen ion, so that a method for reacting a tertiary amine with a carbonate diester can be suitably used.

The anions to be combined with the quaternary ammonium cation may include, for example, tetrafluoroboric acid, hexafluorophosphoric acid, hexafluoroarsenic acid, hexafluoroantimonic acid, trifluoromethansulfonic acid, bis(trifluoromethansulfonyl)imide, tris(trifluoromethansulfonyl)methide, and perchloric acid. Tetrafluoroboric acid can be most preferably used as the anion, because they can provide an electrolyte solution that has good electric conductivity due to large ionic mobility and high degree of dissociation of salt, high decomposition voltage, high hydrolysis resistance and good heat stability.

The solvent composed mainly of the cyclic carbonate is preferably used as the nonaqueous electrolyte solution, because they have good electric conductivity and high decomposition voltage and can be used in a wide temperature range. The cyclic carbonates may include, for example, ethylene carbonate, propylene carbonate, butylene carbonate, and vinylene carbonate. Propylene carbonate can be most preferably used as the cyclic carbonate, which can be used singly or in combination of two or more, because it can provide an electrolyte solution that has good electric conductivity and high decomposition voltage and can be used in a wide temperature range.

The solvent preferably comprises only the cyclic carbonate, but the cyclic carbonate may be used mixed with other nonaqueous solvents. The other nonaqueous solvents that may be used mixed with the cyclic carbonate may include, for example, but not limited to, open-chain carbonates such as dimethyl carbonate, ethyl methyl carbonate, and diethyl carbonate, aliphatic monocarboxylates such as methyl acetate and methyl propionate, γ-butyrolactone, γ-valerolactone, acetonitrile, glutaronitrile, adiponitrile, methoxyacetonitrile, 3-methoxypropionitrile, N,N-dimethylformamide, N,N-diethylacetamide, N-methylpyrrolidinone, N-methyloxazolidinone, N,N'-dimethylimidazolidinone, nitromethane, nitroethane, sulfolane, dimethyl sulfoxide, trimethyl phosphate, and ethers such as dimethoxyethane. The nonaqueous solvent may be used singly mixed with the cyclic carbonate, or the mixture of two or more thereof may be used further mixed with the cyclic carbonate.

When triethylmethylammonium tetrafluoroborate is used as the quaternary ammonium salt and propylene carbonate is used as the cyclic carbonate to prepare the nonaqueous electrolyte solution, triethylmethylammonium tetrafluoroborate is preferably dissolved in propylene carbonate in a concentration in the range of 0.1 to 2.5 mol/liter, most preferably in the range of 0.5 to 2.0 mol/liter.

In addition, in the electrical double-layer capacitor 1 of the present embodiment, the nonaqueous electrolyte solution impregnated into the electrode element 3 contains glycols, primary alcohols and tertiary amines as impurities in an amount in the range of a specific allowance, and contains water in an amount in the range of a specific allowance.

The glycols may include propylene glycol, ethylene glycol and diethylene glycol, and the glycols are contained in the nonaqueous electrolyte solution as the impurities in a cyclic carbonate that is the solvent for the nonaqueous electrolyte solution or as an eluate from the polarizable electrode 5.

The cyclic carbonate is produced by a method for reacting an alkylene oxide with carbon dioxide under high temperature and high pressure, or a method for reacting a glycol with a cyclic carbonate in the presence of a catalyst, so that it inevitably contains propylene glycol when propylene carbonate is used, and ethylene glycol when ethylene carbonate is used. These glycols are desirably removed as much as possible in the process for producing the cyclic carbonate. However, the cyclic carbonate that is the product typically contains glycols in an amount in the range of about 200 to 2,000 ppm.

Moreover, in the process for manufacturing the polarizable electrode 5, glycols such as propylene glycol and ethylene glycol are often used as an auxiliary for kneading the carbonaceous material or a solvent of the slurry for coating. Therefore, if it is dried insufficiently after manufactured, the glycols could elute into the nonaqueous electrolyte solution impregnated into the polarizable electrode 5.

If the glycols are contained in the nonaqueous electrolyte solution, the resistance-increasing ratio rises when the electrical double-layer capacitor 1 is used under continuous application of high voltage. Thus, in the electrical double-layer capacitor 1 of the present embodiment, the nonaqueous electrolyte solution requires that the amount of glycols contained as impurities be 30 ppm or less, and if it is more than 30 ppm, the increase of resistance cannot be suppressed. In the electrical double-layer capacitor 1 of the present embodiment, the amount of the glycols contained as impurities is preferably 20 ppm or less, more preferably 10 ppm or less.

The methods for bringing the content of the glycols in the nonaqueous electrolyte solution into the above described range include a method for reducing the glycols in the cyclic carbonates in advance, a method for sufficiently drying the polarizable electrode 5, and a method for suppressing the increase of the glycols with time due to the hydrolysis of the cyclic carbonates by reducing the water content in the nonaqueous electrolysis solution.

The method for reducing the glycols in the cyclic carbonates in advance includes, specifically, rectification of the cyclic carbonates, or absorption treatment thereof with absorbing agents such as silica gel, activated carbon, activated alumina or a molecular sieve. The rectification provides different results depending on the setting of conditions such as a reflux ratio, rectifying temperature and the degree of decompression. On the other hand, the method of absorption treatment is preferred because it can be operated easily.

The methods for bringing the content of the glycols in the nonaqueous electrolyte solution into the above described range may be carried out each singly or in combination.

The primary alcohols may include alcohols having carbon atoms of 4 or less such as methanol, ethanol, n-propanol, i-propanol, n-butanol, i-butanol, s-butanol, and t-butanol. The primary alcohols are contained in the nonaqueous electrolyte solution as an impurity in nonaqueous solvents to be mixed to cyclic carbonates as the solvent for the nonaqueous electrolyte solution, such as open-chain carbonates, monocarboxylate ester and phosphate ester, as an impurity in a quaternary ammonium salt that is the solute of the nonaqueous electrolyte solution, as an eluate from the polarizable electrode 5, or as a decomposition product during the preparation or storage of the nonaqueous electrolyte solution.

In the process for manufacturing the polarizable electrode 5, primary alcohols are often used as an auxiliary agent for kneading the carbonaceous material or a solvent of the slurry for coating. Therefore, if it is dried insufficiently after manufactured, the primary alcohols could elute into the nonaqueous electrolyte solution impregnated into the polarizable electrode 5. Moreover, primary alcohols are sometimes used for recrystallizing the quaternary ammonium salt, and if drying is insufficient after the recrystallization, the primary alcohols can be mixed into the nonaqueous electrolyte solution.

If the primary alcohols are contained in the nonaqueous electrolyte solution, the resistance-increasing ratio rises when the electrical double-layer capacitor 1 is used under continuous application of high voltage. Thus, in the electrical double-layer capacitor 1 of the present embodiment, the nonaqueous electrolyte solution requires that the amount of the primary alcohols contained as impurities be 30 ppm or less, and when it is more than 30 ppm, the increase of resistance cannot be suppressed. In the electrical double-layer capacitor 1 of the present embodiment, the amount of the primary alcohols contained as impurities is preferably 20 ppm or less, more preferably 10 ppm or less.

The methods for bringing the content of the primary alcohols in the nonaqueous electrolyte solution into the above described range include a method for reducing the glycols in the cyclic carbonates in advance, a method for sufficiently drying the polarizable electrode 5 and the quaternary ammonium salt, and a method for suppressing the increase of the primary alcohols with time due to the hydrolysis of the cyclic carbonates by reducing the water content in the nonaqueous electrolysis solution.

The method for reducing the primary alcohols in the cyclic carbonates in advance includes, which is the same as the case of the above described glycols, rectification of the cyclic carbonates, or absorption treatment thereof with the above described absorbing agents.

The methods for bringing the content of the primary alcohols in the nonaqueous electrolyte solution into the above described range may be carried out each singly or in combination.

The above described tertiary amines may include trimethylamine, ethyldimethylamine, diethylmethylamine, triethylamine, tributylamine, N-methylpyrrolidine, N-ethylpyrrolidine, N-methylimidazole, and N-ethylimidazole. Further, in the present specification, the tertiary amines include tertiary amine salts formed by combining the tertiary amines with proton acids in the nonaqueous electrolyte solution.

The tertiary amines are derived from unreacted raw materials for the quaternary ammonium salts. The quaternary ammonium salts are produced by the quaternarization of tertiary amines by carbonate diesters. The quaternarization can be carried out according to the method described in Japanese Patent Publication No. 07-116113, for example, using alcohol such as methanol as a solvent, with a raw material molar ratio of tertiary amine/carbonate diester of generally from 1/1 to 1/5, preferably from 1/1.1 to 1/3. The reaction pressure may be under atmospheric pressure, under reduced pressure or under pressure. Moreover, dimethyl carbonate, ethylmethyl carbonate, diethyl carbonate and diisopropyl carbonate may be used as the carbonate diester, but those having less carbon atoms in an alkyl group such as dimethyl carbonate are preferred because the quaternarization quickly proceeds. The yield of the quaternary ammonium salt by the quaternarization is typically 99% or higher, and can be 99.5% or higher, further 99.8% or higher, by suitably selecting reaction conditions.

However, the yield of the quaternary ammonium salt in the quaternarization may be reduced, if the setting of the reaction conditions such as solvent, molar ratio of raw materials, temperature, pressure, and time is not adequate. If the purification of the quaternary ammonium salt is insufficient in these cases, the tertiary amines may be mixed into the nonaqueous electrolyte solution.

Further, the tertiary amines may be produced by the decomposition of the quaternary ammonium salt during the storage of the nonaqueous electrolyte solution, or by the thermal decomposition of the quaternary ammonium salt itself. Furthermore, as the activated carbon composing the polarizable electrode 5 is prone to absorb moisture, the moisture absorbed in the activated carbon reacts with the quaternary ammonium salt in the nonaqueous electrolyte solution impregnated into the polarizable electrode 5 to produce the tertiary amines, if the polarizable electrode 5 is insufficiently dried.

When the tertiary amines are contained in the nonaqueous electrolyte solution, energy residual ratio (voltage-holding ratio) decreases due to self-discharge when the electrical double-layer capacitor 1 is left standing for a long period of time. Thus, in the electrical double-layer capacitor 1 of the present embodiment, the nonaqueous electrolyte solution requires that the amount of the tertiary amines contained as impurities be less than 20 ppm, and if it is 20 ppm or more, the reduction of the energy residual ratio (voltage holding ratio) cannot be suppressed when the electrical double-layer capacitor 1 is left standing for a long period of time. In the electrical double-layer capacitor 1 of the present embodiment, the amount of the tertiary amines contained as impurities is preferably 10 ppm or less, more preferably 5 ppm or less.

The methods for bringing the content of the tertiary amines in the nonaqueous electrolyte solution into the above described range include a method for increasing the yield of the quaternary ammonium salt as high as possible by appropriately selecting the reaction conditions in the quaternarization of the tertiary amines by the carbonate diesters, a method for removing the unreacted tertiary amines remaining in the quaternary ammonium salt that is the reaction product, and a method for suppressing the thermal decomposition of the quaternary ammonium salt by paying attention to the control of the temperatures for handling and storing the quaternary ammonium salt and the nonaqueous electrolyte solution.

The methods for removing the unreacted tertiary amines remaining in the quaternary ammonium salt include a method for removing by the evaporation of the tertiary amines by heating the quaternary ammonium salt under reduced pressure and a method for recrystallizing the quaternary ammonium salt. However, for the recrystallization, attention should be paid to the conditions such as the types of the solvent to be used for the recrystallization, the amount thereof, crystallization temperature, and the number of the crystallization.

The methods for bringing the content of the tertiary amines in the nonaqueous electrolyte solution into the above described range may be carried out each singly or in combination.

The content of the impurities in the nonaqueous electrolyte solution impregnated into the electrode element 3 can be determined by analyzing the nonaqueous electrolyte solution extracted from the electrical double-layer capacitor 1. The analysis for the glycols and primary alcohols can be carried out by the analyzing methods such as gas chromatography, liquid chromatography and gas chromatography-mass spectrometry. The analysis for the tertiary amines can be carried out by the analyzing methods such as liquid chromatography, ion chromatography and capillary electrophoresis.

The water contained in the nonaqueous electrolyte solution impregnated into the electrode element 3 is derived from the cyclic carbonate or the nonaqueous solvent itself which is used mixed with the cyclic carbonate, and is also derived from the quaternary ammonium salt. The water contained in the nonaqueous electrolyte solution would hydrolyze the cyclic carbonate to produce the glycols and primary alcohols, or reacts with the quaternary ammonium salt to produce the tertiary amines.

Therefore, in the electrical double-layer capacitor 1 of the present embodiment, the nonaqueous electrolyte solution preferably has a water content of 50 ppm or less, and when it is more than 50 ppm, the hydrolysis of the cyclic carbonate or the reaction of the water with the quaternary ammonium salt is hard to be suppressed. The electrical double-layer capacitor 1 of the present embodiment has a water content of more preferably 30 ppm or less, most preferably 20 ppm or less.

Examples and comparative examples of the present invention will now be described.

EXAMPLE 1

In the present example, an activated carbon as an active material was first mixed with acetylene black and polytetrafluoroethylene in a weight ratio of activated carbon: acetylene black: polytetrafluoroethylene=84:8:8 to obtain a mixture. The mixture was further added to isopropanol as an auxiliary agent for kneading, and kneaded under pressure for 8 minutes to obtain a kneaded product in which polytetrafluoroethylene is fibrillated.

Next, the kneaded product was ground to a ground powder having an average particle size of about 1 mm, and the ground powder was subjected to calendering to obtain a sheet-like molding. Then, the sheet-like molding was rolled to prepare an electrode sheet (carbonaceous material layer) 9 having a width of 110 mm. The electrode sheet was adhered to both sides of the aluminum current collector 8 having a width of 115 mm to prepare a polarizable electrode 5. The polarizable electrode 5 was continuously dried by exposing it to dry air of 150° C. supplied at a flow rate of 3 liter/minute for thirty minutes.

Next, two sheets of the polarizable electrodes 5 were disposed opposite to each other with a rayon-based separator 6 interposed therebetween to prepare an electrode element 3. Then, the electrode element 3 was wound in the longitudinal direction and contained around a hollow core 7 in a cylindrical container 2 with a bottom made of aluminum. The electrodes 5 and 5 and the separator 6 were in a state where they are wound around the core 7. Then, the cylindrical container 2 with a bottom containing the electrode element 3 was dried under a reduced pressure of 5 Pa and at a temperature of 160° C. for 24 hours.

Next, triethylamine and dimethyl carbonate were mixed with methanol as a solvent in a molar ratio of triethylamine/dimethyl carbonate=1/1.5, heated under a pressure of 1.5 MPa and at a temperature of 135° C. for 15 hours to carry out quaternarization until a conversion of 99.9% is achieved to obtain a reaction solution of triethylmethylammonium methylcarbonate. The conversion was measured by gas chromatography.

Next, the reaction solution of triethylmethylammonium methylcarbonate was reacted with 42% aqueous solution of fluoroboric acid at room temperature to obtain a reaction solution of triethylmethylammonium tetrafluoroborate. Then, the reaction solution of triethylmethylammonium tetrafluoroborate was added to n-butanol and subjected to rectification to remove methanol, dimethyl carbonate and water to obtain a tank bottom liquid containing crude triethylmethylammonium tetrafluoroborate. Then, the crude triethylmethylammonium tetrafluoroborate was purified by crystallization using n-butanol/water mixed solvent (85/15 in weight ratio) to obtain purified triethylmethylammonium tetrafluoroborate.

Next, the purified triethylmethylammonium tetrafluoroborate was dissolved in propylene carbonate purified by rectification and subjected to distillation under reduced pressure to remove water and n-butanol, while removing part of propylene carbonate, to prepare a triethylmethylammonium tetrafluoroborate-propylene carbonate solution of 1.8 mol/liter, as a nonaqueous electrolyte solution.

Next, the nonaqueous electrolyte solution was impregnated into the electrode element 3 contained in the cylindrical container 2 with a bottom, and opening 2a of the container 2 was sealed with a lid 4. Thus, an electrical double-layer capacitor 1 having a construction shown in FIG. 1 was prepared.

After the electrical double-layer capacitor 1 was prepared, the nonaqueous electrolyte solution impregnated into the electrode element 3 was collected and analyzed by gas chromatography. It was observed that the nonaqueous electrolyte solution contained 3 ppm of propylene glycol as glycols. In addition, the content of n-butanol as primary alcohols was analyzed by gas chromatography to be 2 ppm. Further, the content of triethylamine as tertiary amines was analyzed by ion chromatography to be outside of detection limit, and was estimated to be less than 10 ppm.

Moreover, the water contained in the nonaqueous electrolyte solution was measured by a Karl Fischer moisture titrator to be 44 ppm.

Next, the electrical double-layer capacitor 1 obtained in the present example was subjected to constant-current charge with a current of 20 A under an environment of 25° C. to achieve a voltage of 2.7 V, and then subjected to constant-voltage charge for 10 minutes. Then, rebound voltage after subjected to constant-current discharge with a current of 30 A to a voltage of 1.0 V was divided by the current to calculate initial resistance.

Next, the electrical double-layer capacitor 1 obtained in the present example was subjected to continuous application of a voltage of 2.5V under an environment of 45° C.; the resistance after a lapse of 256 hours was measured; and the resistance-increasing ratio relative to the initial resistance was calculated. The results are shown in Tables 1 and 2, and FIGS. 2 and 3.

EXAMPLE 2

The electrical double-layer capacitor 1 was prepared exactly the same way as in Example 1 except that, when the nonaqueous electrolyte solution impregnated into the electrode element 3 was collected and analyzed by gas chromatography after the electrical double-layer capacitor 1 was prepared, the nonaqueous electrolyte solution was adjusted to contain 23 ppm of propylene glycol as glycols.

Next, the initial resistance and the resistance after a lapse of 256 hours were measured exactly the same way as in Example 1 for the electrical double-layer capacitor 1 obtained in the present example, and the resistance-increasing ratio relative to the initial resistance was calculated. The results are shown in Table 1 and FIG. 2.

COMPARATIVE EXAMPLE 1

The electrical double-layer capacitor 1 was prepared exactly the same way as in Example 1 except that, when the nonaqueous electrolyte solution impregnated into the electrode element 3 was collected and analyzed by gas chromatography after the electrical double-layer capacitor 1 was prepared, the nonaqueous electrolyte solution was adjusted to contain 58 ppm of propylene glycol as glycols.

Next, the initial resistance and the resistance after a lapse of 256 hours were measured exactly the same way as in Example 1 for the electrical double-layer capacitor 1 obtained in the present comparative example, and the resistance-increasing ratio relative to the initial resistance was calculated. The results are shown in Table 1 and FIG. 2.

COMPARATIVE EXAMPLE 2

The electrical double-layer capacitor 1 was prepared exactly the same way as in Example 1 except that, when the nonaqueous electrolyte solution impregnated into the electrode element 3 was collected and analyzed by gas chromatography after the electrical double-layer capacitor 1 was prepared, the nonaqueous electrolyte solution was adjusted to contain 112 ppm of propylene glycol as glycols.

Next, the initial resistance and the resistance after a lapse of 256 hours was measured exactly the same way as in Example 1 for the electrical double-layer capacitor 1 obtained in the present comparative example, and the resistance-increasing ratio relative to the initial resistance was calculated. The results are shown in Table 1 and FIG. 2.

TABLE 1

|  | Propylene glycol concentration (ppm) | Resistance-increasing ratio (%) |
|---|---|---|
| Example 1 | 3 | 103.5 |
| Example 2 | 23 | 104.3 |
| Comparative Example 1 | 58 | 108.7 |
| Comparative Example 2 | 112 | 113.1 |

It is apparent from Table 1 and FIG. 2 that, when the amount of glycols as impurities contained in the nonaqueous electrolyte solution is 30 ppm or less (Examples 1 and 2), the resistance-increasing ratio when used under continuous application of voltage is less than 105% which is the allowable value of the increasing ratio, that is, the increase of resistance can be suppressed. On the other hand, it is apparent that, when the amount of glycols as impurities contained in the nonaqueous electrolyte solution is more than 30 ppm (Comparative Examples 1 and 2), the resistance-increasing ratio is higher than 105%, that is, the increase of resistance is larger.

EXAMPLE 3

The electrical double-layer capacitor 1 was prepared exactly the same way as in Example 1 except that, when the nonaqueous electrolyte solution impregnated into the electrode element 3 was collected and analyzed by gas chromatography after the electrical double-layer capacitor 1 was prepared, the nonaqueous electrolyte solution was adjusted to contain 22 ppm of n-butanol as primary alcohols.

Next, the initial resistance and the resistance after a lapse of 256 hours were measured exactly the same way as in Example 1 for the electrical double-layer capacitor 1 obtained in the present example, and the resistance-increasing ratio relative to the initial resistance was calculated. The results are shown in Table 2 and FIG. 3.

COMPARATIVE EXAMPLE 3

The electrical double-layer capacitor 1 was prepared exactly the same way as in Example 1 except that, when the nonaqueous electrolyte solution impregnated into the electrode element 3 was collected and analyzed by gas chromatography after the electrical double-layer capacitor 1 was prepared, the nonaqueous electrolyte solution was adjusted to contain 53 ppm of n-butanol as primary alcohols.

Next, the initial resistance and the resistance after a lapse of 256 hours were measured exactly the same way as in Example 1 for the electrical double-layer capacitor 1 obtained in the present comparative example, and the resistance-increasing ratio relative to the initial resistance was calculated. The results are shown in Table 2 and FIG. 3.

COMPARATIVE EXAMPLE 4

The electrical double-layer capacitor 1 was prepared exactly the same way as in Example 1 except that, when the nonaqueous electrolyte solution impregnated into the electrode element 3 was collected and analyzed by gas chromatography after the electrical double-layer capacitor 1 was prepared, the nonaqueous electrolyte solution was adjusted to contain 102 ppm of n-butanol as primary alcohols.

Next, the initial resistance and the resistance after a lapse of 256 hours were measured exactly the same way as in Example 1 for the electrical double-layer capacitor 1 obtained in the present comparative example, and the resistance-increasing ratio relative to the initial resistance was calculated. The results are shown in Table 2 and FIG. 3.

TABLE 2

|  | n-Butanol concentration (ppm) | Resistance-increasing ratio (%) |
|---|---|---|
| Example 1 | 2 | 103.5 |
| Example 3 | 22 | 102.5 |
| Comparative Example 3 | 53 | 105.1 |
| Comparative Example 4 | 102 | 109.9 |

Figure 3:
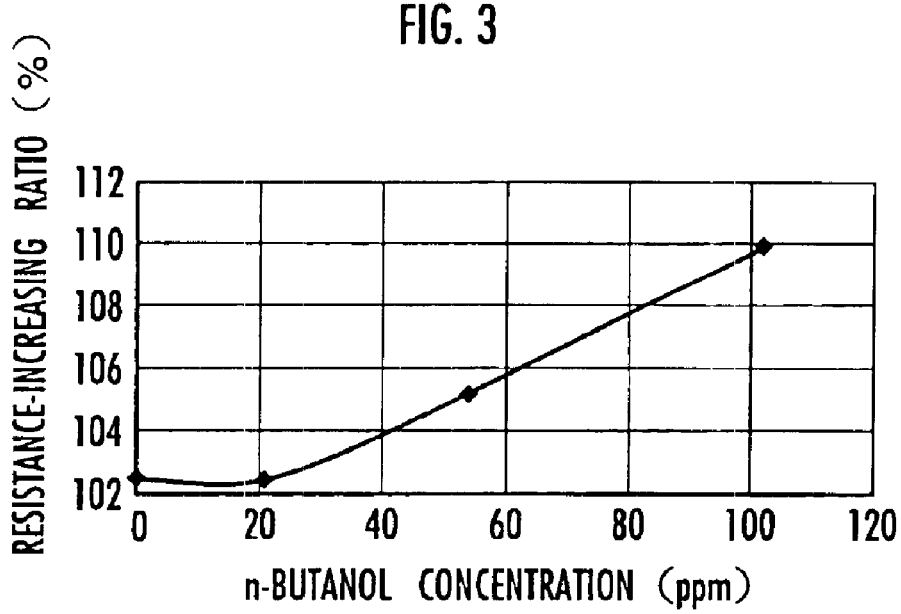
FIG. 3 is a graphical representation showing the relation of n-butanol concentration to the resistance-increasing ratio.

It is apparent from Table 2 and FIG. 3 that, when the amount of primary alcohols as impurities contained in the nonaqueous electrolyte solution is 30 ppm or less (Examples 1 and 3), the resistance-increasing ratio when used under continuous application of voltage is less than 105% which is the allowable value of the increasing ratio, that is, the increase of resistance can be suppressed. On the other hand, it is apparent that, when the amount of primary alcohols as impurities contained in the nonaqueous electrolyte solution is more than 30 ppm (Comparative Examples 3 and 4), the resistance-increasing ratio is higher than 105%, that is, the increase of resistance is larger.

EXAMPLE 4

In the present example, the electrical double-layer capacitor obtained in Example 1 was charged to 2.5 V and left standing under environments of 25° C. for 72 hours, 168 hours, 336 hours and 840 hours. Thereafter, respective terminal voltages were measured, and the voltage-holding ratios to the voltage of 2.5 V were calculated. The results are shown in Table 3 and FIG. 4.

COMPARATIVE EXAMPLE 5

The electrical double-layer capacitor 1 was prepared exactly the same way as in Example 1 except that, when the nonaqueous electrolyte solution impregnated into the electrode element 3 was collected and analyzed by ion chromatography after the electrical double-layer capacitor 1 was prepared, the nonaqueous electrolyte solution was adjusted to contain 20 ppm of triethylamine as tertiary amines.

Next, the voltage-holding ratio was calculated exactly the same way as in Example 4 for the electrical double-layer capacitor 1 obtained in the present comparative example. The results are shown in Table 3 and FIG. 4.

COMPARATIVE EXAMPLE 6

The electrical double-layer capacitor 1 was prepared exactly the same way as in Example 1 except that, when the nonaqueous electrolyte solution impregnated into the electrode element 3 was collected and analyzed by ion chromatography after the electrical double-layer capacitor 1 was prepared, the nonaqueous electrolyte solution was adjusted to contain 51 ppm of triethylamine as tertiary amines.

Next, the voltage-holding ratio was calculated exactly the same way as in Example 4 for the electrical double-layer capacitor 1 obtained in the present comparative example. The results are shown in Table 3 and FIG. 4.

COMPARATIVE EXAMPLE 7

The electrical double-layer capacitor 1 was prepared exactly the same way as in Example 1 except that, when the nonaqueous electrolyte solution impregnated into the electrode element 3 was collected and analyzed by ion chromatography after the electrical double-layer capacitor 1 was prepared, the nonaqueous electrolyte solution was adjusted to contain 101 ppm of triethylamine as tertiary amines.

Next, the voltage-holding ratio was calculated exactly the same way as in Example 4 for the electrical double-layer capacitor 1 obtained in the present comparative example. The results are shown in Table 3 and FIG. 4.

TABLE 3

|  | Tertiary amine concentration (ppm) | Voltage-holding ratio (%) | | | |
|---|---|---|---|---|---|
|  |  | 72 hours | 168 hours | 336 hours | 840 hours |
| Example 1 | — | 96.1 | 91.1 | 83.1 | 62.9 |
| Comparative Example 5 | 20 | 95.5 | 89.8 | 80.7 | 58.4 |
| Comparative Example 6 | 51 | 95.1 | 88.9 | 79.1 | 55.7 |
| Comparative Example 7 | 101 | 94.1 | 86.8 | 75.3 | 49.2 |

It is apparent from Table 3 and FIG. 4 that, when the amount of tertiary amines as impurities contained in the nonaqueous electrolyte solution is less than 20 ppm (Examples 1), high voltage can be held even after being left standing for a long period of time, that is, excellent self-discharge properties are exhibited relative to the cases where the amount of tertiary amines is more than 20 ppm (Comparative Examples 5 to 7).

What is claimed is:

1. An electrical double-layer capacitor comprising:

an electrode element consisting of a separator and a pair of electrodes disposed opposite to each other with said separator interposed therebetween, said electrode element being impregnated with a nonaqueous electrolyte solution, wherein said nonaqueous electrolyte solution is prepared by dissolving a quaternary ammonium salt in a cyclic carbonate, and the impurities contained in said nonaqueous electrolyte solution impregnated into said electrode element comprise 30 ppm or less of glycols, 30 ppm or less of primary alcohols and less than 20 ppm of tertiary amines.

2. The electrical double-layer capacitor according to claim 1, wherein a water content in said nonaqueous electrolyte solution impregnated into said electrode element is 50 ppm or less.

3. The electrical double-layer capacitor according to claim 1, wherein said quaternary ammonium salt is triethylmethylammonium tetrafluoroborate.

4. The electrical double-layer capacitor according to claim 1, wherein said cyclic carbonate is propylene carbonate.

5. The electrical double-layer capacitor according to claim 4, wherein said nonaqueous electrolyte solution is prepared by dissolving triethylmethylammonium tetrafluoroborate in propylene carbonate in a concentration ranging from 0.1 to 2.5 mol/liter.

6. The electrical double-layer capacitor according to claim 1, wherein said electrode is a polarizable electrode composed of an activated carbon.

* * * * *